Figures 1, 2, 3, 4, 5:
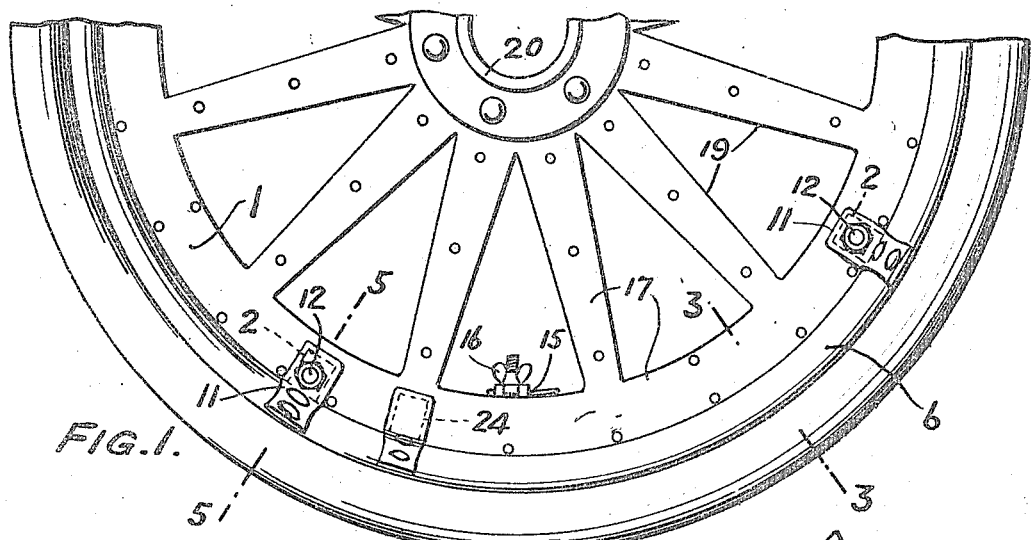

C. E. CAMERON.
WHEEL.
APPLICATION FILED MAY 29, 1915.

1,187,706.  Patented June 20, 1916.

WITNESS:
Robt R Kitchel

INVENTOR
Charles E. Cameron
BY
Augustus A. Stoughton
ATTORNEY

UNITED STATES PATENT OFFICE.

CHARLES EDWARD CAMERON, OF COLLINGSWOOD, NEW JERSEY, ASSIGNOR OF ONE-HALF TO WILLIAM L. HURLEY, OF CAMDEN, NEW JERSEY.

WHEEL.

1,187,706.

Specification of Letters Patent.

Patented June 20, 1916.

Application filed May 29, 1915. Serial No. 31,101.

*To all whom it may concern:*

Be it known that I, CHARLES E. CAMERON, a citizen of the United States, and a resident of Collingswood, in the county of Camden and State of New Jersey, have invented certain new and useful Improvements in Wheels, of which the following is a specification.

The principal objects of the present invention are to provide a light, strong, hollow steel wheel having a demountable rim which can be quickly applied and removed and which in use is firm, silent and strong; and to provide a demountable rim consisting of sections which can be drawn together laterally so as to pull the shoe around the inner tube or other inner fitting of the tire.

The invention will be claimed at the end hereof, but will be first described in connection with the embodiment of it chosen for illustration in the accompanying drawings, in which—

Figure 1, is a side view of a part of a wheel embodying features of the invention. Fig. 2, is a sectional view of the same. Fig. 3 is a section on the line 3—3 of Fig. 1. Fig. 4, is a cross-section through the hub and adjacent parts of spokes, and Fig. 5, is a sectional view on the line 5—5 of Fig. 1.

In the drawings 1 is a hollow fixed rim rectangular or box-like in cross-section, and it is provided on one face with lateral openings 2 spaced apart.

3 is a turnable ring arranged in the hollow rim 1 and provided with circumferentially arranged bolts 4 spaced from and connected with it by brackets 5.

6, is a demountable tire-receiving rim consisting of two sections 7 and 8 laterally separable.

9 indicates keepers or fastenings adapted to enter the openings 2 and provided with holes 10 for receiving the bolts 4.

The rim section 8 is connected with the keeper section 9 and the rim section 7 is connected with the keeper section 11 that is detachably connected with the part 9 by screws 12. The screws 12 are useful for drawing the sections 7 and 8 together laterally and so affording means for drawing the shoe around its filling. By shifting the ring 3 toward the right, in Fig. 2, all of the bolts are withdrawn from the keepers and so the detachable rim can be pulled off laterally. The operation of applying the detachable rim involves movement of the ring toward the left.

13 is a stud connected with the ring 3 and adapted to work in a slot 14 and to be secured by a hinged fork or plate 15 and a thumb-nut 16; it furnishes means for shifting the ring in the manner described.

24 is a recess for accommodating the filling connection of the inner tube.

Face plates 17 and 18 constitute the fixed rim, spoke-parts 19 and hub-parts 20 and there are angle sections 21 transverse to the plates and constituting with them box-spokes and a box-fixed rim. The various parts are riveted together and constitute a strong, light structure, the parts of which can be pressed. The trough sections 22 constitute important parts of the openings in the hollow fixed rim, since they serve to engage the keepers.

What I claim is:

1. A steel wheel having a hollow fixed rim provided with lateral openings spaced apart, a turnable ring arranged in the hollow rim and provided with circumferentially arranged bolts, a demountable tire-receiving rim, and keepers adapted to enter said openings to receive said bolts and secured to the demountable rim, substantially as described.

2. A steel wheel having a hollow fixed rim provided with lateral openings spaced apart, a turnable ring applied in the hollow rim and provided with circumferential bolts spaced from it, a demountable tire-receiving rim, keepers adapted to enter said openings to receive said bolts and secured to the demountable rim, a handle member secured to the ring and working in a slot in the fixed rim, and a hinge member and set-screw coöperating with the handle member.

In testimony whereof I have hereunto signed my name.

CHARLES EDWARD CAMERON.

In the presence of—
CLIFFORD K. CASSEL,
FRANK E. FRENCH.